(12) United States Patent
Mirzaei et al.

(10) Patent No.: US 9,461,680 B1
(45) Date of Patent: Oct. 4, 2016

(54) WIRELESS RECEIVER (71) Applicant: Broadcom Corporation, Irvine, CA (US)

(72) Inventors: Alex Ahmad Mirzaei, Irvine, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/687,653

(22) Filed: Apr. 15, 2015

Related U.S. Application Data (60) Provisional application No. 62/140,428, filed on Mar. 30, 2015.

(51) Int. Cl.
*H04B 7/00* (2006.01)
*H04B 1/10* (2006.01)
*H04B 1/00* (2006.01)

(52) U.S. Cl.
CPC ............ *H04B 1/1027* (2013.01); *H04B 1/006* (2013.01); *H04B 1/0053* (2013.01); *H04B 2001/1054* (2013.01)

(58) Field of Classification Search
CPC .................................................. H04B 1/1027
USPC ........................................................ 455/269
See application file for complete search history.

(56) References Cited

U.S. PATENT DOCUMENTS

| 6,118,984 | A | * | 9/2000 | Yu-Hong | ............ | H03C 3/0966 455/76 |
|---|---|---|---|---|---|---|
| 8,285,240 | B2 | * | 10/2012 | Seendripu | ............ | H03D 3/007 455/303 |
| 8,483,642 | B2 | | 7/2013 | Mirzaei et al. | | |
| 8,565,711 | B2 | | 10/2013 | Mirzaei et al. | | |
| 2011/0299459 | A1 | | 12/2011 | Mirzaei et al. | | |
| 2011/0299631 | A1 | | 12/2011 | Mirzaei et al. | | |
| 2011/0299632 | A1 | | 12/2011 | Mirzaei et al. | | |
| 2011/0299633 | A1 | | 12/2011 | Mirzaei et al. | | |
| 2011/0299634 | A1 | | 12/2011 | Mirzaei et al. | | |
| 2011/0299635 | A1 | | 12/2011 | Mirzaei et al. | | |
| 2011/0300813 | A1 | | 12/2011 | Mirzaei et al. | | |
| 2011/0300818 | A1 | | 12/2011 | Mirzaei et al. | | |
| 2013/0272349 | A1 | | 10/2013 | Mirzaei et al. | | |
| 2014/0016729 | A1 | | 1/2014 | Mirzaei et al. | | |
| 2014/0140455 | A1 | | 5/2014 | Mirzaei et al. | | |

FOREIGN PATENT DOCUMENTS

EP 2 600 534 A1 6/2013

* cited by examiner

*Primary Examiner* — Sanh Phu
(74) *Attorney, Agent, or Firm* — Brinks Gilson & Lione (57) ABSTRACT A system includes a first filter circuitry and one or more second filter circuitry. The first filter circuitry can operate at a frequency of a wireless signal to filter the wireless signal to attenuate undesired feedthrough components and pass through a desired component. The system can also include a multi-phase mixer to convert the frequency of the wireless signal to a lower frequency and divide the wireless signal into at least four phase shifted baseband signal components. The second filter circuitry can operate at the lower frequency to filter the phase shifted baseband signal components to attenuate undesired feedthrough components and pass through a desired component. The system can also include a matrix to combine the baseband signal components to form an output signal.

20 Claims, 9 Drawing Sheets

WIRELESS RECEIVER

PRIORITY CLAIM

This application claims the benefit of priority to U.S. provisional patent application Ser. No. 62/140,428, filed Mar. 30, 2015 which is incorporated by reference in its entirety.

TECHNICAL FIELD

This disclosure relates to wireless devices and more specifically to a receiver of a wireless device.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population.

Wireless communication devices include cellular telephones, two-way radios, personal digital assistants (PDAs), personal computers (PC), tablets, laptop computers, home entertainment equipment, household appliances, and/or any other device capable of generating digital data. Such wireless communication devices include a receiver to receive wireless signals and/or a transmitter to transmit wireless signals.

DETAILED DESCRIPTION

The discussion below makes reference to a wireless receiver that can be part of a system on a chip, or may be included in two or more discreet components. The wireless receiver may include a receiver architecture that does not need a surface acoustic wave (SAW) filter to attenuate out of band unwanted feed through components by using matching components in the SAW filter. Instead, the wireless receiver is able to eliminate the feed through components in the absence of a SAW filter by creating equal and opposite out of band components that cancel when combined. In an example of a super-heterodyne receiver, a received RF signal can be filtered with an RF filter circuitry to eliminate feed through components before being down converted to an intermediate frequency (IF) and separated into at least four phased shifted signals. The at least four phase shifted signals can be filtered with an IF filter circuitry, and the filtered phase shifted signals can be combined such that components of the filtered phase shifted signals are canceled by the multiple filterings to thereby substantially eliminate feedthrough components.

In examples, each of the RF and IF filter circuitry may include a matrix of switches that are switchable with phase offset clock signals, such as phase offset versions of a local oscillation (LO) clock signal to connect an input signal to a baseband impedance. Both of the matrix of switches used in the different filtering operations may be controlled with an LO clock signal operating at a frequency of the intermediate frequency (IF) to eliminate the feed through components. Additional switches included in the RF filtering circuitry may be controlled with another LO clock signal operating at a predetermined frequency between the RF frequency and the IF frequency. In examples where there are only two clock signals, the LO clock signal operating at a predetermined frequency between the RF frequency and the IF frequency and the IF frequency clock signal can be combined to generate an RF frequency clock signal.

The filters may include any number of input ports (M number of ports) and may include any number of phase shifted signals (M phase-based filters) to attenuate feedthrough components. In a chip-based example, such as a system on a chip (SOC), since switches, such as CMOS switches, are used to effect each of the M input ports and M phase shifted signals, there is little or no chip area penalty or power consumption penalty with the addition of more ports and/or addition of more phase shifted signals. In addition, in examples where there are only two clock signals, since the switches can be used to create the phase shifted signals, additional clocks/clock phases may not be necessary.

Figure 1:
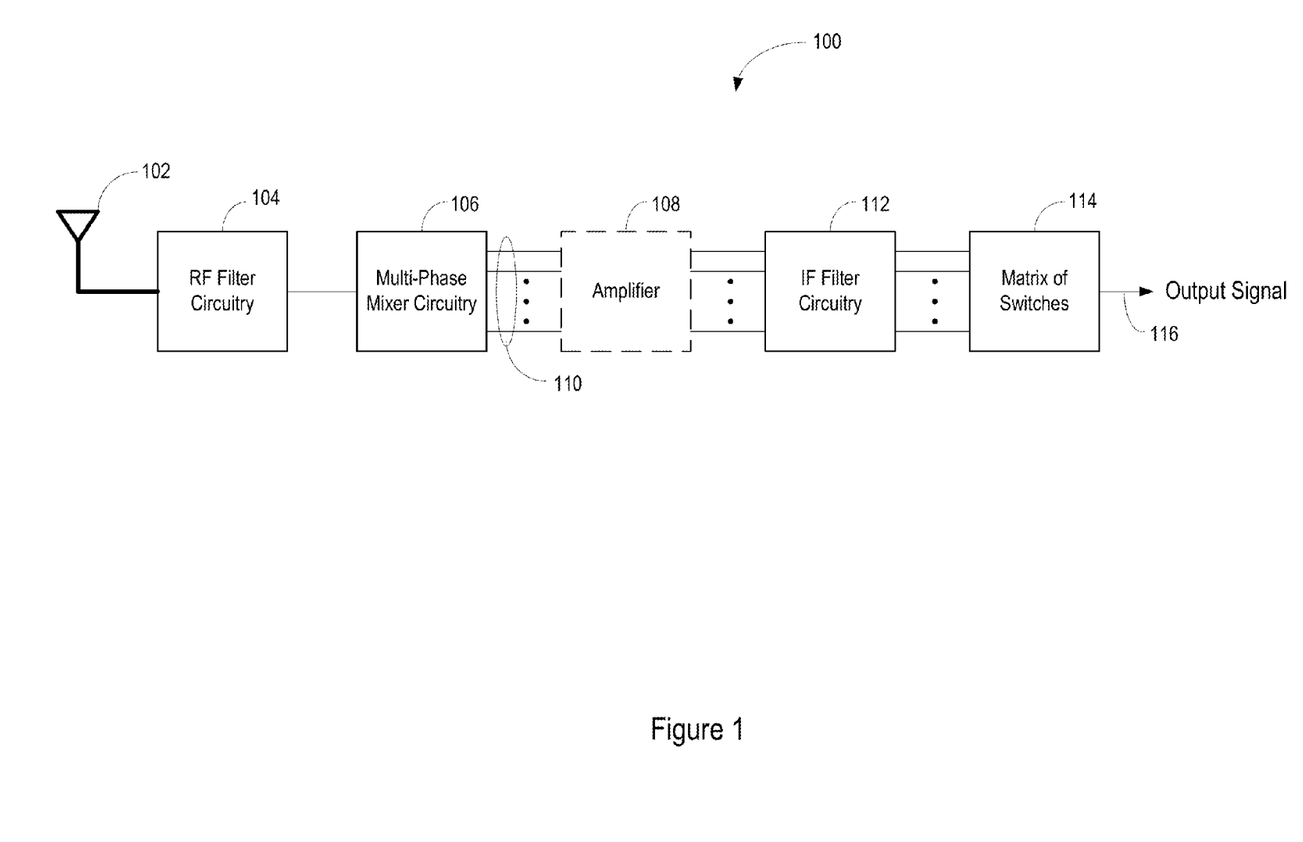
FIG. 1 shows a block diagram of an example wireless receiver.

FIG. 1 is a block diagram example of a wireless receiver 100. The wireless receiver 100 can be included in any device or system capable of processing transmitted and/or received wireless signals. The wireless receiver 100 may be a implemented with one or more system on a chip (SOC), discrete components, application specific integrated circuits (ASIC), discrete analog and digital circuits, and other circuitry.

The wireless receiver 100 can be included in a transceiver or other system for wired and/or wireless communication. The transceiver or other system may include modulation/demodulation circuitry, digital to analog converters (DACs), shaping tables, analog to digital converters (ADCs), filters, waveform shapers, pre-amplifiers, power amplifiers and/or other circuitry for transmitting and receiving through a physical (e.g., wireline) medium such as coaxial cable, Ethernet cable, or a telephone line, or wirelessly through one or more antennas. Examples include mobile devices, set top boxes, laptops, or any other device or system that includes a processor and memory. The transceiver may include electrical and optical networking transceivers. Examples of electrical networking transceivers include coaxial cable network transceivers, such as a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

The receiver 100 may receive wirelessly transmitted network data through one or more networks including, for example, the Internet, or other LAN/WAN networks whether private or public, from many different sources. Examples of sources include file servers; communication satellites; computer systems; network devices such as switches, routers, and hubs; and remote databases; as well as mobile devices connected, for example, through cellular base stations. The transceiver and/or system that includes the receiver 100 can include one or more processors and memories. The memory stores, for example, control instructions that the processor can execute to carry out the described functionality for the system, such as operating the receiver 100.

The wireless receiver 100 can include an antenna 102 for receiving radio signals at a first frequency, such as a radio frequency (RF) to support Bluetooth (BT), Wireless LAN (WLAN), Near Field Communications (NFC), and 2G, 3G, and 4G/Long Term Evolution (LTE) communications. An example RF signal is a 1.1 GHz RF signal. RF signals received at the antenna 102 may be communicated to an RF filter circuitry 104 that is coupled to the antenna 102. As used herein, the term "coupled" may describe a directly wired interface, an indirectly wired interface, bus communication, and/or any combination that allows electrical signals to pass between coupled components, circuitry or devices.

As described herein, although the illustrated examples of the wireless receiver 100 depict a single antenna for SISO (single input single output) communications, in other examples MISO (multiple input single output) communications and MIMO (multiple input multiple output) communications are possible. In these examples, a plurality of antennas (e.g., 2 or more) can be coupled to the wireless receiver 100 and corresponding hardware functionality as described herein can be provided.

The RF filter circuitry 104 may represent a high Q frequency translated band pass filter centered at a center frequency, such as the frequency of the RF signal received at the antenna 102, and may have any number (M) of input ports. The RF filter circuitry 104 may operate at the RF frequency to divide the RF signal into M phases represented as a sequential series of signal components. Each of the signal components can be provided to a respective M port, and be individually filtered by the RF filter circuitry 104. The filtering may remove undesired components above or below a desired frequency (center frequency) while allowing the desired component in the vicinity of the center frequency to pass through. As used herein, radio frequency (RF) includes frequencies in the radio frequency band up to 3 GHz and frequencies in the millimeter (microwave band) frequency band of 3 GHz to 300 GHz.

The filtered RF signal can be communicated to a multi-phase mixer circuitry 106. The multi-phase mixer circuitry 106 can down-convert from the frequency of the filtered RF signal to an intermediate frequency (IF) signal. In addition, the multi-phase mixer circuitry 106 can generate at least four phase signals (M phase signals) at the IF frequency. The frequency of the IF signal can be, for example 100 MHz. All of the phase shifted baseband signals may be communicated to an IF amplifier 108 using respective base band communication paths 110. Alternatively, the IF amplifier 108 may be omitted, and the phase shifted baseband signals may be provide on the respective base band communication paths 110 to an IF filter circuitry 112.

The amplifier 108 can include a number of amplifiers representing a number of base band communication paths 110 that are equal to the number of phase shifted baseband signals operating at the intermediate frequency. The IF amplifier 108 can be an inverter-based IF amplifier. Alternatively, or in addition, the IF amplifier 108 may be a current to voltage converter. The amplified phase shifted baseband signals, or the non-amplified phase shifted baseband signals may be supplied to M ports included in the IF filter circuitry 112.

The IF filter circuitry 112 can operate at the IF frequency to filter the amplified, or non-amplified, phase shifted base band signals. The IF filter circuitry may be a high Q band pass filter centered at a center frequency, such as the intermediate frequency (IF), and have any number (M) of input ports that correspond to the number (M) of phase shifted baseband signals. In examples, that include the IF amplifier 108, the IF filter circuitry 112 may be a passive filter, whereas in other examples, the IF filter circuitry 112 may be an active filter. In examples, there may be a number of amplifiers 108 and/or IF filter circuitry 112, which may be connected in a series, or in a sequence, to provide multiple stages of amplification and/or filtering of the phase shifted baseband signals. During the filtering process, undesired components may be removed, whereas desired components in the vicinity of the center frequency (IF frequency) can pass through. Where there is a sequence of stages of filtering in the IF stage, each stage of IF filtering may similarly pass through components in the vicinity of the center frequency while cancelling undesired pass through components present at other frequencies.

The filtered phase shifted baseband signals may be communicated to a matrix of switches 114. The matrix of switches 114 may use switching of the switches to combine the filtered M phase shifted based band signals to form an output signal on an output line 116. In addition to recombination of the filtered phase shifted signals, the matrix of switches 114 may also perform weighting of the phase shifted base band signals to adjust the contribution of individual phased shifted base band signals in the output signal. Weighing can be performed using, for example, an op-amp based summing amplifier with different weights, where the weights can be implemented by adjusting resistor sizes. The weighting can be used to extract the desired signal while removing other harmonic contents. In other examples, the weighting can be performed in other ways, or omitted.

Figure 2:
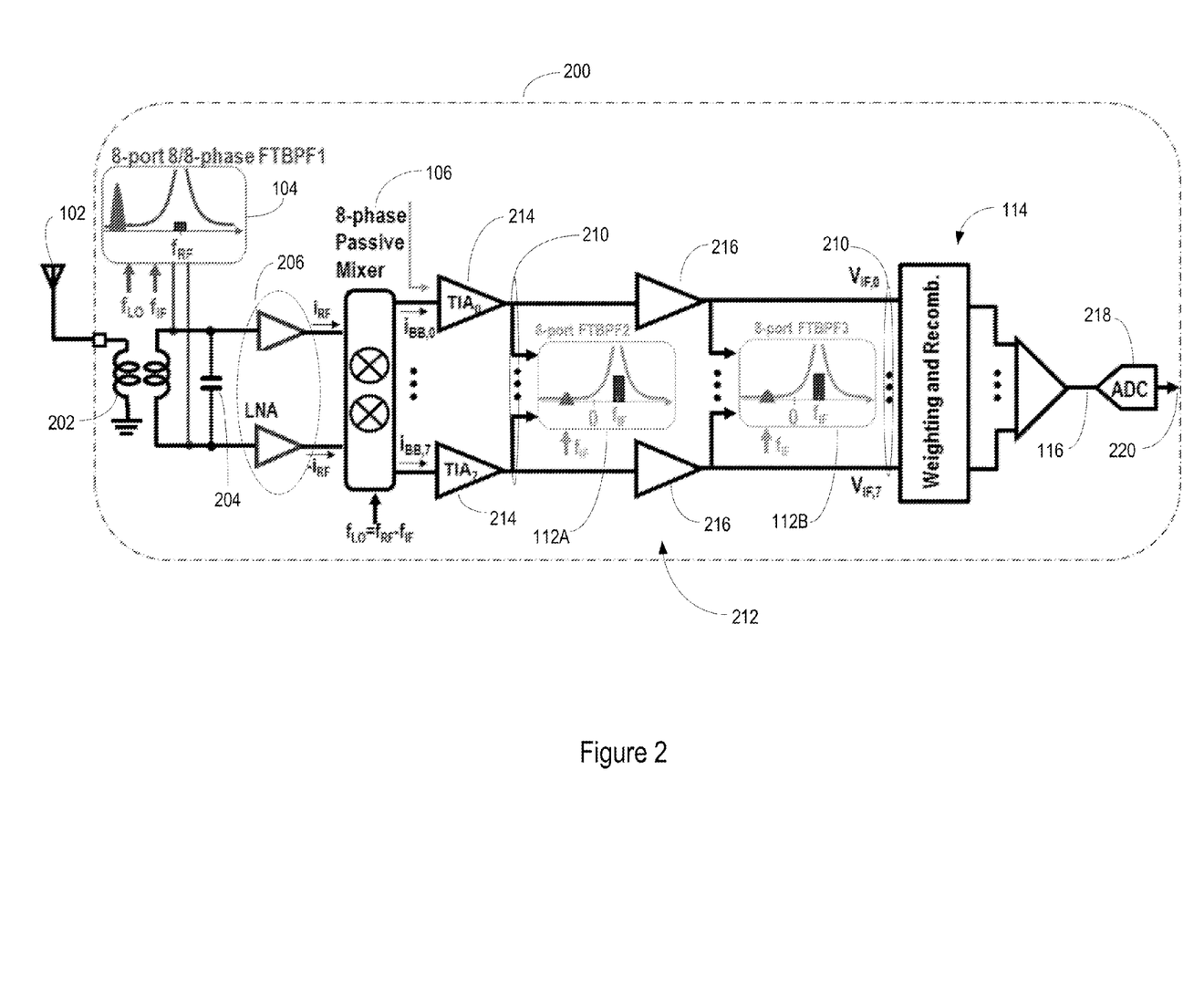
FIG. 2 is a block diagram of another example of a receiver.

FIG. 2 is a block diagram of another example of a receiver 200, at least a portion of which may be described as, for example, an RF to IF receiver section of an SOC. The receiver 200 receives wireless RF signals via the antenna 102, and can include the RF filter circuitry 104, as well as a transformer 202 and/or a capacitor network 204, such as a tunable capacitor network, and/or an inverter based low noise amplifier (LNA) circuitry 206. RF signals received by the antenna 102 can be processed through the transformer 202 and filtered by the RF filter circuitry 104. The transformer 202 can receive the inbound wireless RF signal and convert it into a differential current signal ($i_{RF}$, $-i_{RF}$), which is filtered by the capacitor network 204. The capacitor network 204 can be, for example, a number of series coupled switches and capacitors, which can be coupled in parallel. The capacitor network 204 can receive a feedback control signal from a baseband processing portion of the wireless receiver and/or another processing module to enable a desired capacitance.

In addition, the RF filter circuitry 104 can filter the differential current signal ($i_{RF}$, $-i_{RF}$) to remove undesirable feedthrough components present in the inbound wireless RF signal. Undesirable feedthrough components may include, for example, DC offset and flicker noise. In the illustrated example, the RF filter circuitry 104 includes a number M of input ports (M=8) into which the RF input signal is divided as a sequential series of signal components, using M phases (M=8), by which the RF signal is band pass filtered. In other examples, any other number (M) of input ports and corresponding number (M) of phases may be used.

Figure 3:
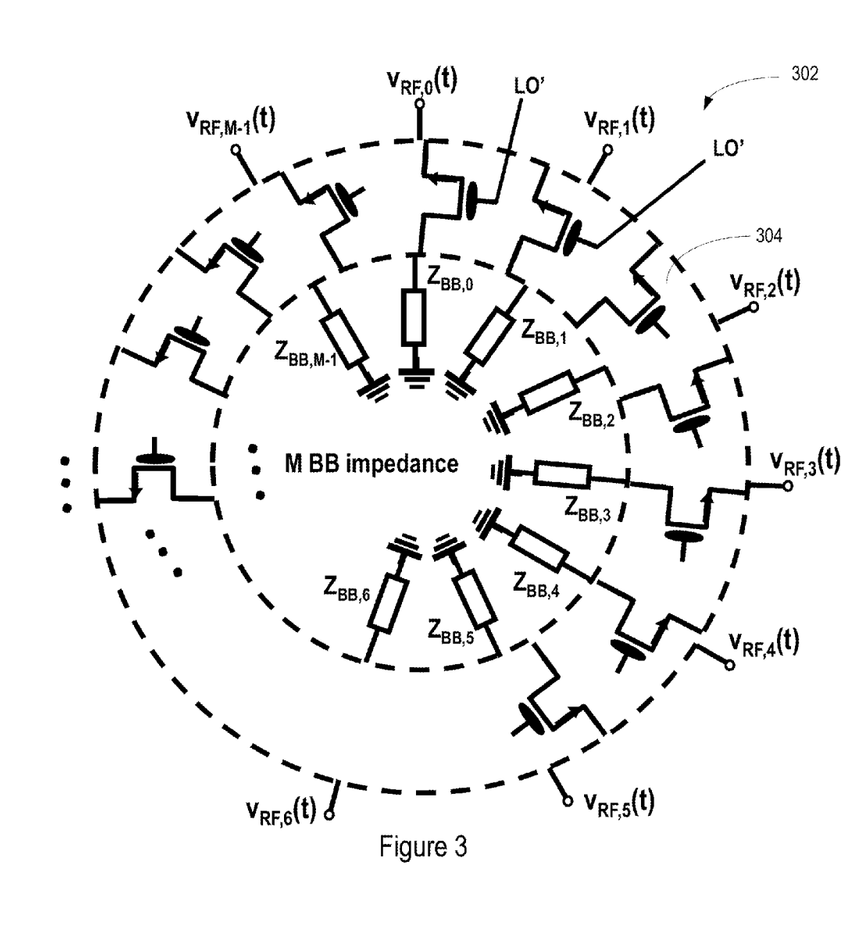
FIG. 3 is a schematic diagram illustrating an example configuration a band pass filter circuitry.
Figure 4:
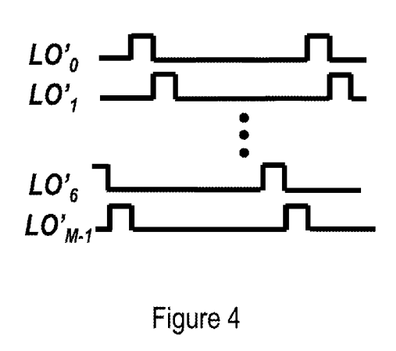
FIG. 4 is an example phase shift timing diagram for use with the band pass filter circuitry illustrated in FIG. 3.

FIG. 3 is a schematic diagram illustrating an example configuration of a band pass filter circuitry 302, which can form at least a portion of the RF filter circuitry 104. As described later, an example band pass filter circuitry configuration can also be present in the IF filter circuitry 112. In FIG. 3, RF voltage components ($V_{RF,0}$ ... $V_{RF,M-1}$) represent M inputs are generated when a matrix of switches 304 are selectively switched. In an example, the matrix of switches 304 may be included an integrated circuit, where each of the switches are complementary metal-oxide-semiconductor (CMOS) switches included in an SOC, although in other examples, other switches capable of transitioning between a conducting and a non-conducting state can be used. The matrix of switches 304 are driven by M different phase shifted signals of a clock signal LO' having a predetermined frequency. In the example of FIG. 3, the clock signal LO' is an IF clock signal at an intermediate frequency $f_{IF}$. An example of the M different phase shifted clock signals is illustrated in the example phase shift timing diagram of FIG. 4, where each of the phase shifted clock signal (LO'$_0$, LO'$_1$, LO'$_{M-1}$) are equal in magnitude and are equally phase shifted by a predetermined amount.

Referring again to FIG. 3, the RF filter circuitry 104 also includes M baseband impedances ($Z_{BB}$). The number of baseband impedances ($Z_{BB,0}$, $Z_{BB,1}$, ... $Z_{BB,M-1}$) corresponds to the number of phase shifted clock signals (LO$_0$, LO$_1$, ... LO$_{M-1}$). Each of the M baseband impedances ($Z_{BB}$) can be low pass impedances, such as capacitors formed in an integrated circuit, such as an SOC. In an example, all of the M baseband impedances ($Z_{BB}$) are equal ($Z_{L,0}(\omega)=Z_{L,1}(\omega)=...=Z_{L,M-1}(\omega)=Z_L(\omega)$), however, in other examples, the impedance values of the M baseband impedances ($Z_{BB}$) can vary, in accordance with the desired magnitudes of the phase shifted RF voltage signals ($V_{RF,0}$, ... $V_{RF,M-1}$) and the corresponding desired attenuation of the feedthrough components.

Figure 5:
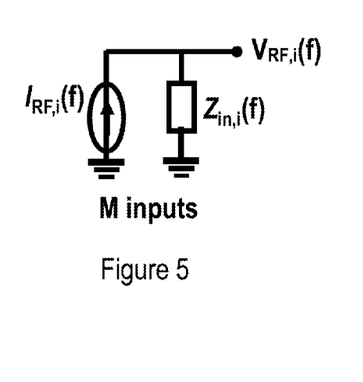
FIG. 5 is a circuit schematic generally illustrating generation of phase shifted RF voltage signals for each of M inputs within the band pass filter circuitry illustrated in FIG. 3.

During operation, the matrix of switches 304 are selectively switched between a conducting and non-conducting state by the phase shifted clock signals (LO'$_0$, LO'$_1$, ... LO'$_{M-1}$) to couple and conduct the differential current signal ($i_{RF}$, $-i_{RF}$) through the baseband impedances ($Z_{BB,0}$, $Z_{BB,1}$, ... $Z_{BB,M-1}$) and generate the phase shifted RF voltage signals ($V_{RF,0}$ ... $V_{RF,M-1}$). FIG. 5 is a circuit schematic generally illustrating generation of the phase shifted RF voltage signals ($V_{RF,0}$ ... $V_{RF,M-1}$). The phase shifted RF voltage signals ($V_{RF,0}$ ... $V_{RF,M-1}$) can be generated for each of M inputs, where M is equal to the number of input ports, i=(0, 1, ... M−1), $Z_{in,i}(f)$ is the input impedance created from the baseband impedances ($Z_{BB,0}$, $Z_{BB,1}$, ... $Z_{BB,M-1}$) by the conducting switches in the matrix of switches for a given i and the differential current signal $I_{RF,i}(f)$ represents a sequential series of signal components ($I_{rf,0}$, $I_{rf,1}$, ... $I_{rf,M-1}$) as described elsewhere.

Figure 6:
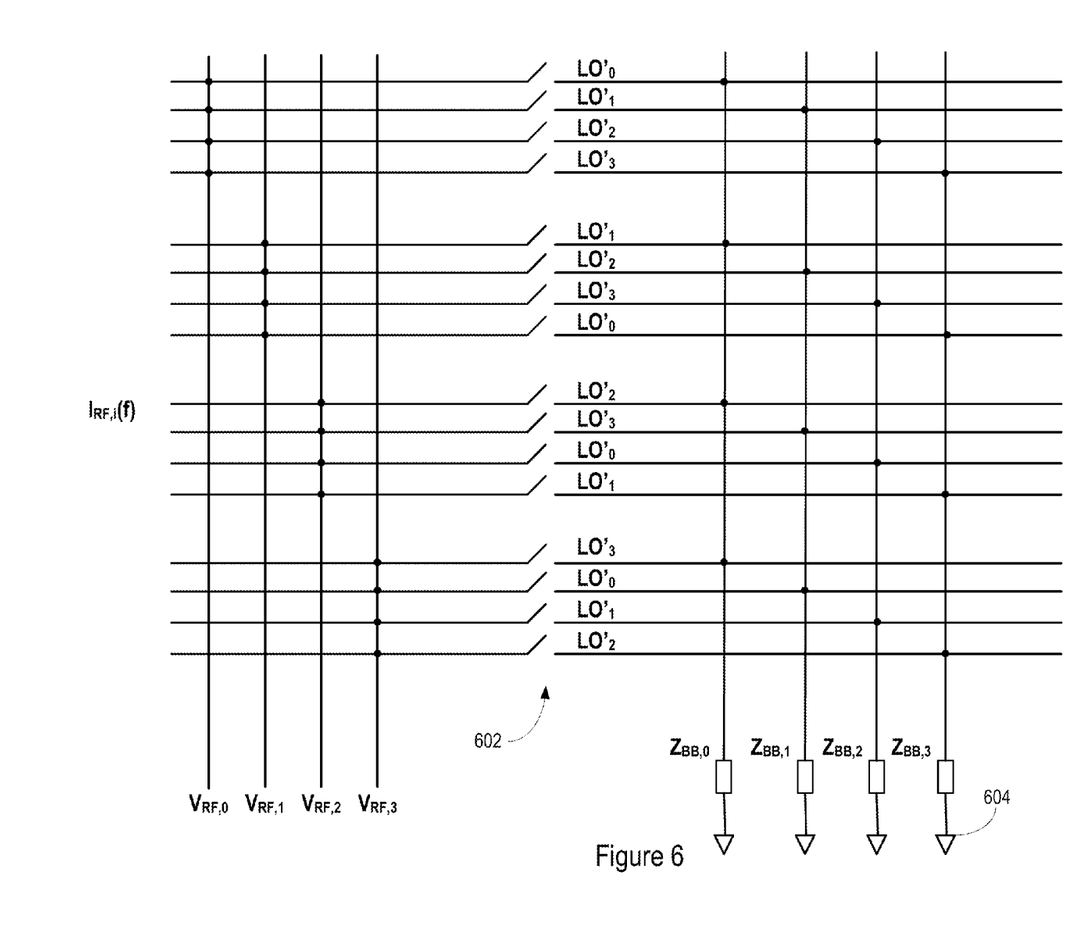
FIG. 6 is an example schematic of an M×M matrix of switches included in the band pass filter circuitry of FIG. 3.

FIG. 6 is an example schematic of an M×M matrix of switches 602 included in the band pass filter circuitry of FIG. 3. The matrix of switches 602 can be selectively switched to generate the phase shifted RF voltage signals ($V_{RF,0}$ ... $V_{RF,M-1}$) by selectively coupling the baseband impedances ($Z_{BB,0}$, $Z_{BB,1}$, ... $Z_{BB,M-1}$) with the differential current signal ($i_{RF}$, $-i_{RF}$), which is illustrated as the sequential series of signal components $I_{RF,i}(f)$ in FIG. 6. The example schematic of FIG. 6 is drawn singular for purposes of explanation, however the actual matrix circuit is differential due to the differential current signal ($i_{RF}$, $-i_{RF}$).

In FIG. 6, the switches 602 are driven in sets using the M different phase shifted clock signal (LO'$_0$, ... LO'$_w$). For example when phase shifted clock signal LO'$_0$ goes high, the differential current signal $I_{RFi}$ is independently coupled with each of the baseband impedances ($Z_{BB,0}$, $Z_{BB,1}$, ... $Z_{BB,M-1}$) to generate the phase shifted RF voltage signals ($V_{RF,0}$ ... $V_{RF,M-1}$) by the current flow to ground 604. Thus, during the time when one of the phase shifted clock signal (LO'$_0$, LO'$_1$, ... LO'$_{M-1}$) are high, the sequential series of signal components $I_{RF,i}(f)$ are independently and sequentially coupled with one of the baseband impedances ($Z_{BB,0}$, $Z_{BB,1}$, ... $Z_{BB,M-1}$) to generate the corresponding phase shifted RF voltage signals ($V_{RF,0}$ ... $V_{RF,M-1}$). During one clock cycle of the clock signal (LO'), the sequential series of signal components $I_{RF,i}(f)$ will be sequentially coupled with each of the baseband impedances ($Z_{BB,0}$, $Z_{BB,1}$, ... $Z_{BB,M-1}$) to generate all of the phase shifted RF voltage signals ($V_{RF,0}$ ... $V_{RF,M-1}$). The duty cycle of the switches 602 during will be based on the number of input ports M. In the example of FIG. 6, M=4, and the duty cycle of the switches 602 is 25%, whereas in the example of M=8, the duty cycle of the switches 502 is 12.5%.

During the switching process, vectors representing undesired feedthrough components and a vector representing the desired signal component in the vicinity of the center frequency are created at each of the phase shifted clock signals (LO'$_0$, LO'$_1$, ... LO'$_{M-1}$) during a cycle. Filtering is accomplished when the vectors are combined due to cancellation of the undesired feedthrough components, which are represented by equal and opposite vectors (180 out of phase), whereas the vectors representative of the desired signal component in the vicinity of the center frequency are constructively additive.

Figure 7:
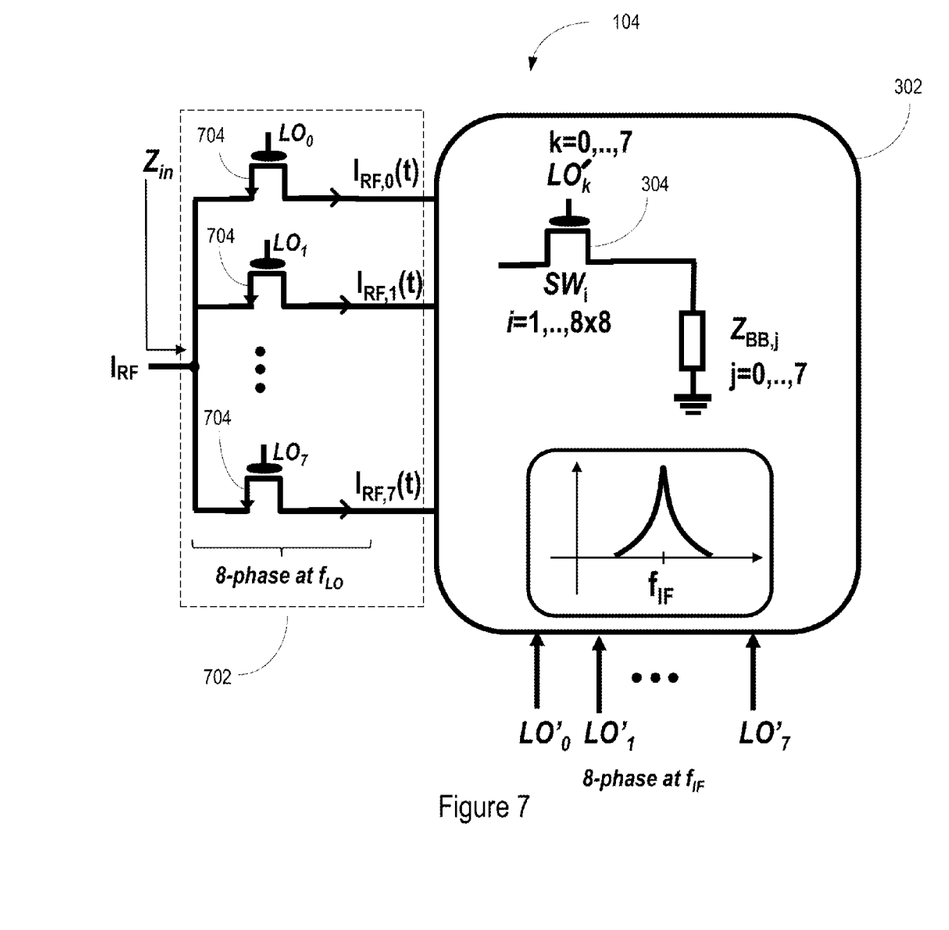
FIG. 7 is an example circuit schematic illustrating an example of RF filter circuitry.

FIG. 7 is an example circuit schematic illustrating an example of the RF filter circuitry 104. In the illustrated example, the RF filter circuitry 104 includes a phase filter circuitry 702 cooperatively operating with an example of the band pass filter 302 of FIG. 3. The phase filter circuitry 702 operates phase filter switches 704 at the phase shifted predetermined clock signals (LO$_0$, LO$_1$, ... LO$_{M-1}$) operating a predetermined frequency $f_{LO}$ to divide the differential current signal $I_{RFi}$, into the sequential series of signal components ($I_{RF,0}$, $I_{RF,1}$, ... $I_{RF,M-1}$). In addition, the band pass filter 302 operates the M×M matrix switches 304 at the intermediate frequency IF using phase shifted clock signals LO'$_k$ (LO'$_0$, LO'$_1$, ... LO'$_{M-1}$) to generate the phase shifted RF voltage signals ($V_{RF,0}$ ... $V_{RF,M-1}$) using the sequential series of components ($I_{RF,0}$, $I_{RF,1}$, ... $I_{RF,M-1}$). In the example of FIG. 7, M=8 such that the phase filter circuitry 702 provides the sequential series of components ($I_{RF,0}$, $I_{RF,1}$, ... $I_{RF,M-1}$) as a series of 8 sequential components or phases at $f_{LO}$ and the band pass filter 302 provides 8 phases at $f_{IF}$ to create $Z_{in}$ from the baseband impedances ($Z_{BB,0}$, $Z_{BB,1}$, ... $Z_{BB,M-1}$) in order to filter each of the sequential series of components ($I_{RF,0}$, $I_{RF,1}$, ... $I_{RF,M-1}$). In this example, the center frequency of the band pass filter 302 is at $f_{IF}$ as illustrated.

In examples, the wireless receiver 200 can operate with only two clock signals, such that the predetermined frequency ($f_{LO}$) is:

$$f_{LO} = f_{RF} - f_{IF} \quad \text{Equation 1}$$

where $f_{RF}$ is the frequency of the incoming wireless RF signal, and the $f_{IF}$ is the baseband frequency. The predetermined frequency ($f_{LO}$) may be a product of the base band frequency $f_{IF}$ multiplied by the number (M) of phase shifted baseband signals. If, for example, the two clocks operate at the $f_{LO}$ and $f_{IF}$, than $f_{RF}$ can be derived by:

$$f_{RF} = f_{LO} + f_{IF}. \quad \text{Equation 2}$$

Figure 8:
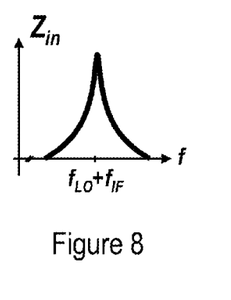
FIG. 8 is a diagram showing an example of a high Q band pass filter included in an example of the RF filter circuitry.

This derived $f_{RF}$ can also be used as the center frequency of the RF filter circuitry 104, as illustrated in FIG. 7. FIG. 8 is a diagram showing an example of a high Q band pass filter included in an example of the RF filter circuitry 104. The illustrated example of the band pass filter operates with a center frequency that is the combination of a first clock signal operating at predetermined frequency ($f_{LO}$) and a second clock signal operating at the intermediate frequency ($f_{IF}$). In FIG. 8, the sequential series of components ($I_{RF,0}$, $I_{RF,1}$, ... $I_{RF,M-1}$) are filtered by the band pass filter.

Figure 9:
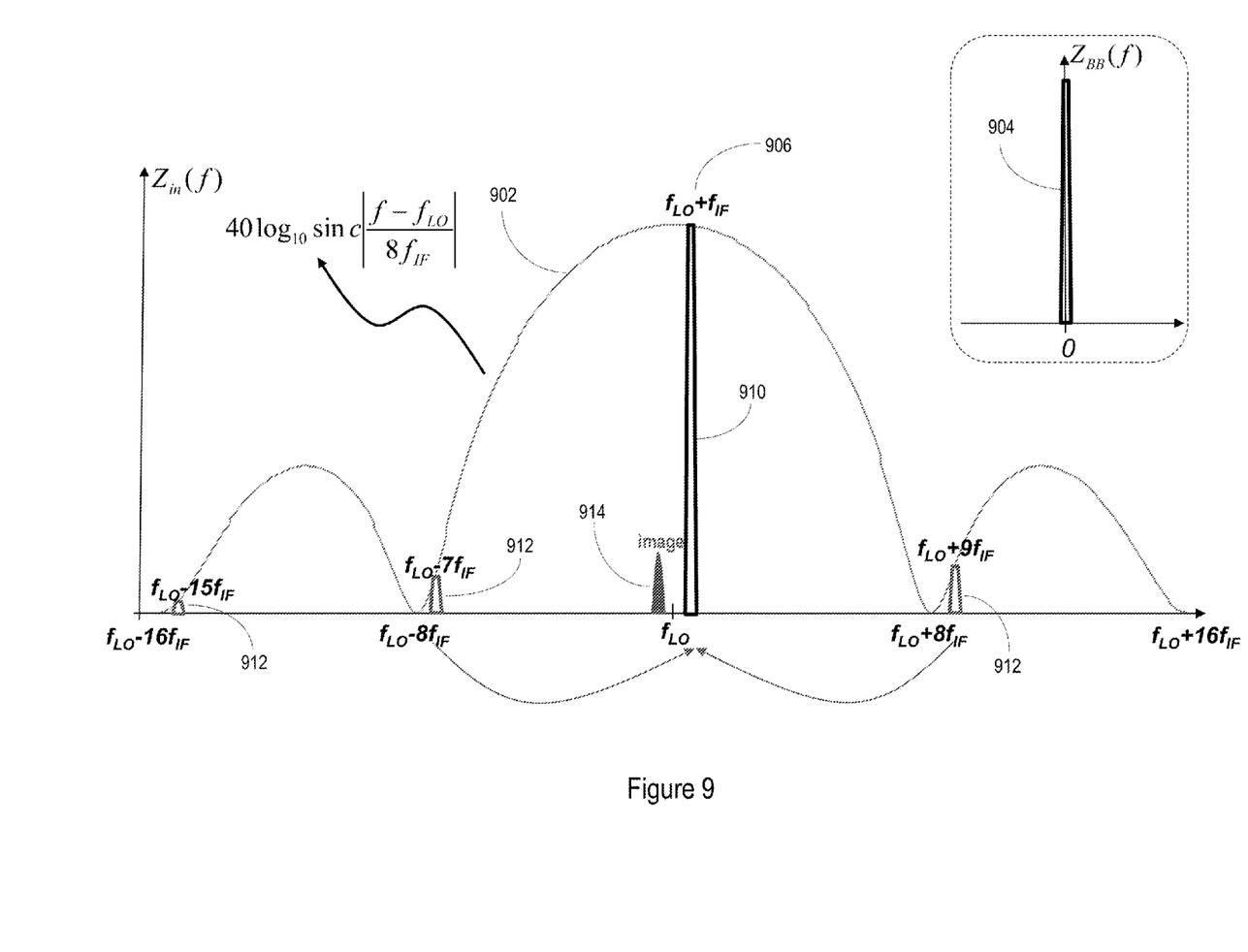
FIG. 9 is an example diagram illustrating filtering performed by an example of the RF filter circuitry.

FIG. 9 is an example diagram illustrating filtering of the sequential series of components ($I_{RF,0}$, $I_{RF,1}$, ... $I_{RF,M-1}$) performed by an example of the RF filter circuitry 104. The slope 902 of the band pass filter 302 is defined by the equation:

$$\text{slope} = 40 \log_{10} \text{sinc} \left| \frac{f - f_{LO}}{8 f_{if}} \right| \quad \text{Equation 3}$$

where f is the RF signal frequency, $f_{if}$ is the frequency of the intermediate frequency clock signal, and $f_{LO}$ is the frequency of the predetermined clock signal (LO). In FIG. 9, the y-axis is input impedance $Z_{in}$ (f) of the RF filter circuitry 104, and the x-axis is the phase shifted predetermined clock signal frequency $f_{LO}$. Also depicted in FIG. 9 is an illustration of the combination of the base band impedances $Z_{BB}(f)$ 904 from the band pass filter 302 resulting from all of the different phase shifted clock signals during a clock cycle. At center frequency $f_{RF} = f_{LO} + f_{IF}$ 906, the desirable signal component 910, which is the filtered sequential series of components ($I_{RF,0}$, $I_{RF,1}$, ... $I_{RF,M-1}$), is allowed to pass through the RF filter circuitry 104, whereas the feed through components 912 and the image 914 are substantially eliminated. The undesirable feedthrough components 912 are illustrated as being substantially attenuated by having a magnitude that equates to a gain of about 1/(M−1), or 7, and 1/(M−1), or 9, when compared to the magnitude of the desired component. In the illustrated example, M=8 and the substantially eliminated feedthrough components are illustrated as appearing at a phase offset from the predetermined clock signal frequency $f_{LO}$ of positive and negative multiples of the intermediate frequency $f_{IF}$, due to the cooperative operation of the pre-filter circuitry 702 and the band pass filter 302. Accordingly, as illustrated in FIG. 9, feed through components at $f_{LO} - 15 f_{IF}$, $f_{LO} - 7 f_{IF}$, and $f_{LO} + 9 f_{IF}$, as well as the image 914 are substantially attenuated due to the cancellation effect of the oppositely phased vectors, as previously discussed.

Referring again to FIG. 2, the low noise amplifier (LNA) circuitry 206, which includes one or more low noise amplifiers coupled in series and/or in parallel, can amplify the inbound filtered wireless RF signal to produce an amplified inbound wireless RF signal. The LNA 206 may receive a control signal from other processing resources, such as SOC processing resources for example, to set parameters of the LNA circuitry 206, such as, for example, at least one of gain, linearity, bandwidth, efficiency, noise, output dynamic range, slew rate, rise rate, settling time, overshoot, and/or a stability factor. The LNA circuitry 206 can output an amplified positive RF current $I_{RF}$, and an amplified negative RF current $-i_{RF}$ to the multi-phase mixer circuitry 106.

The multi-phase mixer circuitry 106 can receive and down convert the amplified inbound positive and negative components of the wireless RF signal to generate four or more (N) phase shifted baseband signals at the intermediate frequency IF. In FIG. 2, the multi-phase mixer circuitry 106 is an eight phase (M) passive mixer, and the four or more (N) phase shifted baseband signals (N=8) are illustrated as current signals $I_{BB,0}$ through $I_{BB,7}$. In other examples, there can be 4, 16, 32, 64, ... phase shifted baseband signals. Each of the phase shifted baseband signals may be provided on separate baseband signal communication paths 210 within a baseband section 212 of the receiver 200.

The multi-phase mixer circuitry 106 can operate at the predetermined frequency ($f_{LO}$) between the RF frequency and the IF frequency. In examples where the wireless receiver 200 can operate with only two clock signals, the predetermined frequency ($f_{LO}$) can be an actual clock signal or a derived clock signal, as previously discussed.

The phase shifted baseband current signals ($I_{BB,0}$ ... $I_{BB,M-1}$) are provided on the respective baseband communication paths 210 to N corresponding transimpedance amplifiers (N=8 in FIG. 2) 214 to convert the current to baseband voltage signal components ($V_{IF,0}$ ... $V_{IF,M-1}$), if the IF filter circuitry 112 includes passive filtering. The phase shifted baseband voltage signals ($V_{IF,0}$ ... $V_{IF,M-1}$) are provided on the baseband communication paths 210 to the IF filter circuitry 112. Alternatively, where the IF filter circuitry 112 includes active filtering, the transimpedance amplifiers 214 can be omitted, and the phase shifted baseband current signals ($I_{BB,0}$ ... $I_{BB,M-1}$) can be converted to the phase shifted baseband voltage signal components ($V_{IF,0}$ ... $V_{IF,M-1}$) using the IF filtering circuitry 112. Thus, as used herein, the terms "phase shifted baseband signals" or "phase shifted baseband components" can refer to either the phase shifted baseband current signals ($I_{BB,0}$ ... $I_{BB,M-1}$) or the phase shifted baseband voltage signals ($V_{IF,0}$ ... $V_{IF,M-1}$).

The IF filter circuitry 112 can be clocked at the IF frequency to process the phase shifted baseband components, such as the phase shifted voltage signal components ($V_{IF,0}$ ... $V_{IF,M-1}$), and substantially eliminate the undesirable feedthrough components. The undesirable feedthrough components can be substantially eliminated by constructive and destructive combination of vectors, since the phase shifted baseband signal components have substantially similar magnitude and are phase shifted with respect to each other. In the illustrated example, the IF filter circuitry 112 includes eight input ports to which the phase shifted baseband voltage signals ($V_{IF,0}$ ... $V_{IF,M-1}$) or the phase shifted baseband current signals ($I_{BB,0}$ ... $I_{BB,M-1}$) are provided, and therefore $I_{BB,M-1} = I_{BB,7}$, or $V_{IF,M-1} = V_{IF,7}$.

Illustrated in FIG. 2 is a first IF filter circuitry 112A and a second IF filter circuitry 112B such that the phase shifted baseband voltage signals ($V_{IF,0}$ ... $V_{IF,M-1}$) are sequentially filtered by the filters 112A and 112B to eliminate undesirable feedthrough components. Between the first IF filter circuitry 112A and the second IF filter circuitry 112B a number N of IF amplifiers 216 equal to the number of baseband communication signals can be positioned to amplify the phase shifted baseband signals when the second IF filter circuitry 112B is a passive filter. Alternatively, where the second IF filter circuitry 112B is an active filter, or is omitted, the IF amplifiers 216 may also be omitted. In other examples, additional IF filter circuitry may be included to provide additional sequential filtering of the phase shifted baseband signals in order to attenuate the undesirable feedthrough components. The number of stages of IF filter circuitry 112 may be determined based on undesirable feedthrough components to be eliminated since with each successive filtering by the IF filter circuitry 112, the undesirable feedthrough components are further minimized towards being substantially eliminated. In addition/alternatively, the number of IF filter circuitry stages can be based on the blocker situation received from antenna 102 and the strength of the desired signal. In example implementations, there can be one or two IF filter circuitry stages or even three or more stages.

Similar to the previously discussed RF filter circuitry 104, the one or more IF filter circuitry 112 may include a band pass filter 302 that receives M inputs, which are coupled to a matrix of switches 304. Thus, for purposes of brevity, the following discussion will focus on aspects of the band pass filter 302 in the IF filter circuitry 112. Referring to FIGS. 3, 4, 5 and 6, the input impedance $Z_{in}$ may be created from baseband impedances ($Z_{BB,0}$, $Z_{BB,1}$, ... $Z_{BB,M-1}$), which corresponds to the number of phase shifted clock signals $LO'_k$ ($LO'_0$, $LO'_1$, ... $LO'_{M-1}$) from the IF clock operating at LO', in order to generate corresponding phase shifted baseband signals. The IF filter circuitry 112 may be clocked at the IF frequency by the IF clock operating at LO' and operate as a band pass filter 302 having a center frequency at the IF frequency of $f_{IF}$. The phase shifted baseband voltage signals ($V_{IF,0}$, ... $V_{IF,M-1}$) or the phase shifted baseband current signals ($I_{BB,0}$ ... $I_{BB,M-1}$) are phase shifted baseband signals subject to predetermined switching of the M×M matrix of switches 304 to be selectively coupled with baseband impedances ($Z_{BB}$). Accordingly, during a cycle of the intermediate frequency $f_{IF}$, each of the phase shifted baseband signals are independently and sequentially coupled with a respective one of the base band impedances ($Z_{BB,0}$, $Z_{BB,1}$, ... $Z_{BB,M-1}$) by the matrix of switches 304.

Figure 10:
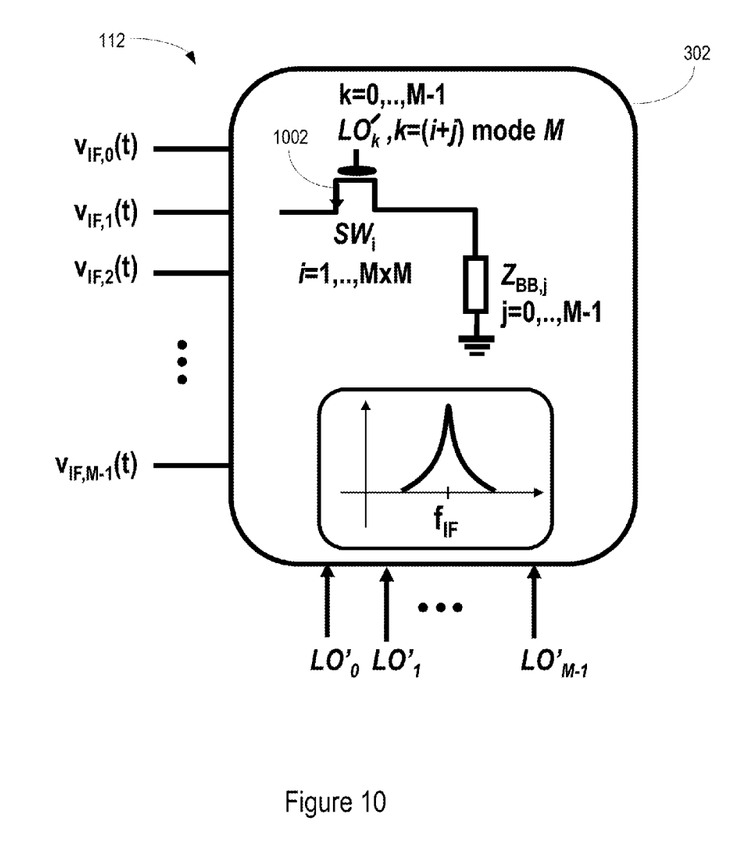
FIG. 10 is a schematic diagram of an example of the IF filter circuitry.

FIG. 10 is a schematic diagram of an example of the IF filter circuitry 112. The IF filter circuitry 112 includes the band pass filter 302 previously discussed with reference to FIGS. 3-6. The phase shifted baseband voltage signals ($V_{IF,0}$ ... $V_{IF,M-1}$) and the phase shifted clock signals ($LO'_0$, $LO'_1$, $LO'_{M-1}$) are provided to the matrix of switches 304, which are represented as a switch 1002 (SWi), where i=1, M×M matrix, and baseband impedance ($Z_{BB,j}$) where j=0, ..., M−1. In the example of FIG. 10, the filtered phase shifted baseband voltage signals ($V_{IF,0}$ ... $V_{IF,M-1}$) at a given time (t) may be represented as:

$$V_{IF,0}(t) \Rightarrow V_{IF,0}, I_{IF,0} \quad \text{Equation 4}$$

$$V_{IF,1}(t) \Rightarrow V_{IF,0} e^{-j\frac{2\pi}{M}}, I_{IF,0} e^{-j\frac{2\pi}{M}} \quad \text{Equation 5}$$

$$V_{IF,2}(t) \Rightarrow V_{IF,0} e^{-j\frac{4\pi}{M}}, I_{IF,0} e^{-j\frac{4\pi}{M}} \quad \text{Equation 6}$$

$$V_{IF,M-1}(t) \Rightarrow V_{IF,0} e^{-j\frac{2(M-1)\pi}{M}}, I_{IF,0} e^{-j\frac{2(M-1)\pi}{M}} \quad \text{Equation 7}$$

The phase shifted clock signals ($LO'_0$, $LO'_1$, ... $LO'_{M-1}$) generated by the clock LO' at the IF frequency are illustrated as $LO'_k$ in FIG. 10, where k=0, ..., M−1. The phase shifted clock signals ($LO'_0$, $LO'_1$, ... $LO'_{M-1}$) selectively energize the matrix of switches 304 to couple the phase shifted baseband signals to each of the different respective based band impedances during each clock cycle to filter the baseband signal components.

Figure 11:
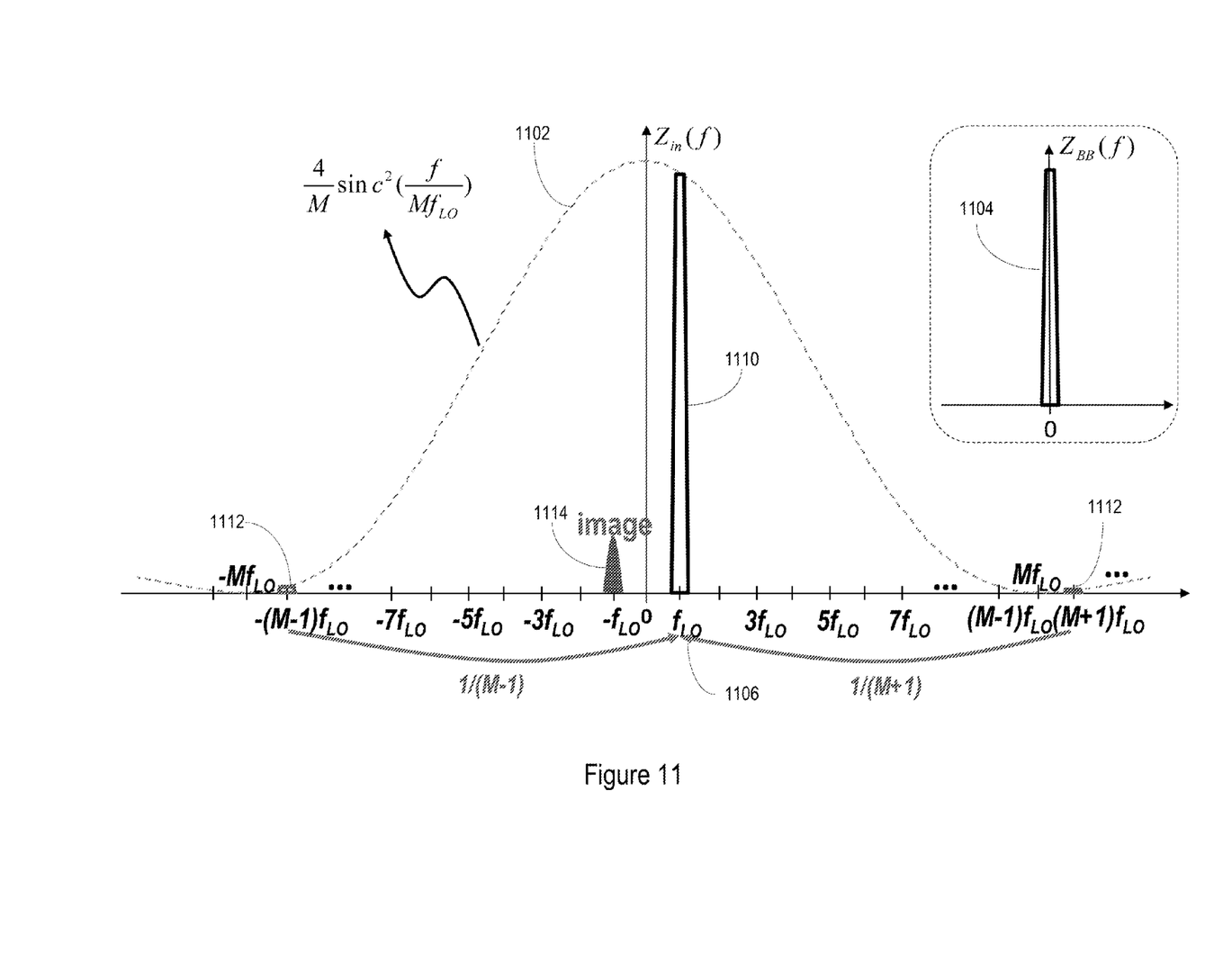
FIG. 11 is an example diagram illustrating band pass filtering performed by the IF filter circuitry.

FIG. 11 is an example diagram illustrating band pass filtering performed by the IF filter circuitry 112. The slope 1102 of the Q of the band pass filter is defined by the equation:

$$\text{slope} = \frac{4}{M}\text{sinc}^2\left(\frac{f}{Mf_{LO}}\right) \quad \text{Equation 8}$$

where M is number of phases, f is the signal frequency $f_{IF}$, $f_{LO}$ is the frequency of the predetermined clock signal (LO). In FIG. 11, the y-axis is input impedance $Z_{in}$ (f) of the IF filter circuitry 112, and the x-axis is the phase shifted predetermined clock signal frequency $f_{LO}$. Also illustrated in FIG. 11 is an illustration of the combination of the base band impedances $Z_{BB}$(f) 1104 of all of the different phase shifted clock signals. The IF filter circuitry 112 is illustrated as operating as a high Q band pass filter at a center frequency $f_{LO}$ 1106, the desirable signal component 1110 is allowed to pass through band pass filter provided by the IF filter circuitry 112. The undesirable feed through components 1112, which are illustrated as appearing at a phase offset from the center frequency $f_{LO}$ 1106 at −(M−1)$f_{LO}$ and (M+1)$f_{LO}$, as well as the image 1114 appearing at −$f_{LO}$ are substantially attenuated due to the cancellation effect of the opposite phase vectors. In FIG. 11, the undesirable feedthrough components 1112 are illustrated as being substantially attenuated by having a magnitude that equates to a gain of about 1/(M−1) and 1/(M+1) when compared to the magnitude of the desired component, as illustrated in FIG. 11.

Referring again to FIG. 2, the filtered phase shifted baseband signals ($V_{IF,0}$ ... $V_{IF,M-1}$) present on the baseband signal communication paths 210 can be combined by the matrix of switches 114 to generate the output signal on an output line 116. The output signal may be converted to a digital output signal with an analog-to-digital converter 218, and provided as a digital output signal on a digital output signal line 220. Undesirable feedthrough components and the image present in the received wireless RF signal can be attenuated by using one or more of the RF filter circuitry 104, the first IF filter circuitry 112A and the second IF filter circuitry 112B.

Figure 12:
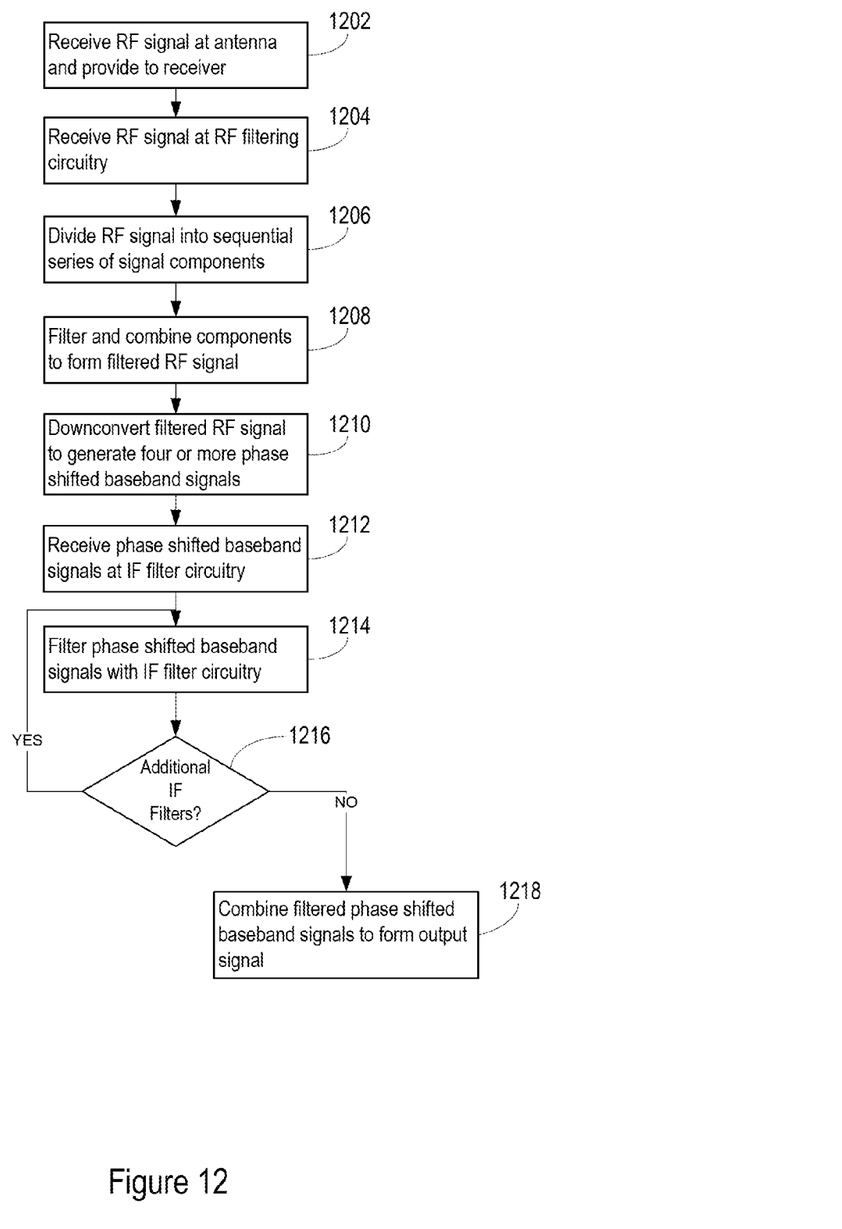
FIG. 12 is a process flow diagram illustrating an example of operation of an example of the receiver 200 with reference to FIGS. 1-11.

FIG. 12 is a process flow diagram illustrating an example of operation of an example of the receiver 200 with reference to FIGS. 1-11. An incoming RF signal is received at antenna 102 and provided to the receiver 200. (1202) The inbound RF signal is received at the RF filter circuitry 104 of the receiver 200 as a differential current signal ($i_{RF}$, −$i_{RF}$) at an RF frequency. (1204) The RF filter circuitry 104 divides the differential current signal ($i_{RF}$, −$i_{RF}$) into a sequential series of signal components ($I_{rf,0}$, $I_{rf,1}$, ... $I_{rf,M-1}$) by driving the switches 704 included in the phase filter circuitry 702 with phase offset clock signals of the predetermined clock signal LO'$_k$ at the intermediate frequency (IF). (1206) The series of signal components ($I_{rf,0}$, $I_{rf,1}$, ... $I_{rf,M-1}$) are filtered with the band pass filter 302 by driving the matrix of switches 304 to selectively couple the sequential series of signal components ($I_{rf,0}$, $I_{rf,1}$, ... $I_{rf,M-1}$) with the baseband impedances ($Z_{BB,0}$, $Z_{BB,1}$, ... $Z_{BB,M-1}$) to generate phase shifted RF voltage signals ($V_{RF,0}$ ... $V_{RF,M-1}$), which are constructively and destructively combined to provide the filtered RF signal containing the desired signal. (1208) The filtered RF signal is down converted by the multi-phase mixer circuit 106 to the IF frequency and converted to four or more phase shifted baseband signals or signal components ($I_{BB,0}$ ... $I_{BB,M-1}$) or ($V_{IF,0}$ ... $V_{IF,M-1}$). (1210)

The phase shifted baseband signal components are received by the IF filter circuitry 112. (1212) The phase shifted baseband signal components are filtered with the band pass filter 302 by driving the matrix of switches 304 to selectively couple the phase shifted baseband signal components with the baseband impedances ($Z_{BB,0}$, $Z_{BB,1}$, ... $Z_{BB,M-1}$). (1214) It is determined if there are additional IF filter circuitry 112 (such as the second IF filter circuitry 112B) included in the baseband section 212. (1216) If there are additional (one or more) IF filter circuitry 112 included in the baseband section, the phase shifted baseband signal components are again filtered with the band pass filter 302 (1212) by driving the matrix of switches 304 in the second IF filter circuitry 112B to selectively couple the phase shifted baseband signal components with the baseband impedances ($Z_{BB,0}$, $Z_{BB,1}$, ... $Z_{BB,M-1}$). If there are no additional IF filter circuitry 112 present in the baseband section 212, the phase shifted baseband signal components are constructively and destructively combined by a matrix of switches 114 to form an output signal on the output line 116. (1218)

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
   an antenna to receive a first signal having a first frequency;
   a first filter circuitry operable at the first frequency to divide the received first signal into a sequential series of signal components and filter each of the signal components;
   a multi-phase mixer to down convert the filtered first signal to a second frequency that is less than the first frequency, and generate from the converted first signal at least four phase shifted second signals having the second frequency;
   a second filter circuitry operable at the second frequency to filter the at least four phase shifted second signals, the second filter circuitry comprising a set of switches configured for energization with a clock signal operable at the second frequency to selectively couple the at least four phase shifted second signals to different respective baseband impedances; and
   a matrix to combine the filtered at least four phase shifted second signals to form an output signal.

2. The device of claim 1, wherein the first filter circuitry comprises a first set of switches clocked at a third frequency to divide the first signal into the sequential series of components, and a second set of switches clocked at the second frequency to selectively couple each of the sequential series of components to a baseband impedance, the third frequency less than the first frequency and greater than the second frequency.

3. The device of claim 2, wherein a sum of the second frequency and the third frequency equals the first frequency.

4. The device of claim 1, wherein the set of switches comprises an M×M matrix of switches to selectively couple the at least four phase shifted second signals to the different respective baseband impedances.

5. The device of claim 4, wherein each of the at least four phase shifted second signals are independently and sequentially coupled with a respective one of the different respective baseband impedances by the matrix of switches during a clock cycle at the second frequency.

6. The device of claim 1, wherein the different respective baseband impedances are substantially equal, and each of the at least four phase shifted second signals are sequentially coupled with all of the different respective baseband impedances by the set of switches.

7. The device of claim 1, wherein the different respective baseband impedances are of substantially equal impedance.

8. A system comprising:
a first filter circuitry operable at a frequency of a wireless signal to filter the wireless signal, the first filter circuitry comprising a phase filter circuitry in cooperative operation with a band pass filter circuitry to filter the wireless signal;
a multi-phase mixer circuitry to convert the frequency of the wireless signal to a lower frequency and divide the wireless signal into at least four baseband signal components;
a second filter circuitry operable at the lower frequency to filter the baseband signal components, the second filter circuitry comprise the band pass filter circuitry to filter the at least four baseband signal components; and
a matrix to combine the baseband signal components to form an output signal.

9. The system of claim 8, wherein each of the first filter circuitry and the second filter circuitry comprise a matrix of switches, the matrix of switches included in the first filter circuitry and the matrix of switches included in the second filter circuitry independently switched at the lower frequency.

10. The system of claim 8, wherein each of the baseband signal components have a substantially similar magnitude and are phase shifted with respect to each other.

11. The system of claim 8, wherein the first filter circuitry comprises a matrix of switches controlled by a first clock signal operable at the lower frequency, and a second clock signal operable at a third frequency that is between the frequency of the wireless signal and the frequency of the lower frequency.

12. The system of claim 8, wherein the system is a system on a chip.

13. A method comprising:
wirelessly receiving at a receiver a signal having a first frequency;
filtering the received signal with a first filter circuitry operable at the first frequency;
down converting and phase shifting the signal with a multi-phase mixer circuitry to create at least four signals at a second frequency;
amplifying the at least four signals with an amplifier;
filtering the at least four signals with a second filter circuitry operable at the second frequency by matrix switching a plurality of switches included in the second filter circuitry with phase offset clock signals operable at the second frequency to selectively couple the at least four signals to a base band impedance; and
combining the at least four signals to form an output signal at the second frequency.

14. The method of claim 13, wherein filtering the received signal with the first filter circuitry operable at the first frequency comprises sequentially operating a first plurality of switches at a third frequency to generate a sequential series of signal components which are phase offset versions of the received signal and matrix switching a second plurality of switches with phase offset clock signals having the second frequency to selectively couple the sequential series of signal components to a base band impedance.

15. The method of claim 13, wherein operation of the first filter circuitry at the first frequency comprises using a combination of the second frequency and a third frequency different from the first frequency and the second frequency.

16. The method of claim 13, wherein matrix switching the plurality of switches included in the second filter circuitry comprises selectively closing some of the switches with one of the phase offset clock signals to couple each of the at least four signals to a different baseband impedance.

17. The method of claim 13, wherein combining the at least four signals to form an output signal comprises destructively summing feed through components at frequencies other than a desired frequency so that the output signal is at the desired frequency without feed through components at undesired frequencies.

18. The device of claim 1, wherein at least some of the different respective baseband impedances have different respective impedance values.

19. The device of claim 18, wherein the different respective impedance values vary in accordance with a desired magnitude of the at least four phase shifted second signals and a desired attenuation provided by the second filter circuitry.

20. The method of claim 16, wherein the different baseband impedance comprises a plurality of different baseband impedances having substantially equal impedance values, or different impedance values.

* * * * *